United States Patent
Du et al.

(10) Patent No.: US 10,965,138 B2
(45) Date of Patent: *Mar. 30, 2021

(54) METHOD, APPARATUS, AND DEVICE FOR CHARGING A BATTERY AND STORAGE MEDIUM

(71) Applicant: Contemporary Amperex Technology Co., Limited, Ningde (CN)

(72) Inventors: Xinxin Du, Ningde (CN); Fuping Luo, Ningde (CN); Shengwei Wang, Ningde (CN); Xin Fu, Ningde (CN)

(73) Assignee: Contemporary Amperex Technology Co., Limited, Ningde (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/919,109

(22) Filed: Jul. 2, 2020

(65) Prior Publication Data

US 2020/0335984 A1 Oct. 22, 2020

Related U.S. Application Data

(62) Division of application No. 16/134,054, filed on Sep. 18, 2018, now Pat. No. 10,742,058.

(30) Foreign Application Priority Data

Sep. 27, 2017 (CN) .......................... 201710891604.3

(51) Int. Cl.
*H02J 7/00* (2006.01)
*H01M 4/505* (2010.01)
(Continued)

(52) U.S. Cl.
CPC ............. *H02J 7/007* (2013.01); *H01M 4/505* (2013.01); *H01M 4/525* (2013.01);
(Continued)

(58) Field of Classification Search
CPC ...................................................... H02J 7/0091
(Continued)

(56) References Cited

U.S. PATENT DOCUMENTS

2017/0271887 A1* 9/2017 Heo ......................... H02J 7/007
2018/0241083 A1* 8/2018 Takami ............... H01M 2/1077

* cited by examiner

*Primary Examiner* — Edward Tso
*Assistant Examiner* — Ahmed H Omar
(74) *Attorney, Agent, or Firm* — Law Offices of Liaoteng Wang

(57) ABSTRACT

The present disclosure provides a method, apparatus, and device for charging a battery, and storage medium. The method for charging a battery includes acquiring a battery temperature; determining a charging current value $I_n$ for the $n^{th}$ charging stage of the battery, according to the battery temperature and a mapping relationship between different temperature ranges and charging current values I, wherein a preset charging cut-off voltage value $V_n$ for the $n^{th}$ charging stage is greater than $V_{n-1}$; charging the battery with $I_j$ in the $j^{th}$ charging stage; acquiring a voltage value of the battery at the current time; if the voltage value is less than $V_j$, continuing to charge the battery with $I_j$; if the voltage value is not less than $V_j$ and j<N, charging the battery with $I_{j+1}$; if the voltage value is not less than $V_j$ and j=N, stopping charging the battery.

18 Claims, 5 Drawing Sheets

(51) Int. Cl.
*H01M 4/525* (2010.01)
*H01M 10/0525* (2010.01)
*H01M 10/44* (2006.01)
*H01M 10/48* (2006.01)

(52) U.S. Cl.
CPC ..... *H01M 10/0525* (2013.01); *H01M 10/443* (2013.01); *H01M 10/486* (2013.01); *H02J 7/008* (2013.01); *H02J 7/0071* (2020.01); *H02J 7/0091* (2013.01); *H02J 7/00712* (2020.01); *H02J 7/007192* (2020.01); *Y02E 60/10* (2013.01); *Y02E 60/13* (2013.01)

(58) Field of Classification Search
USPC .......................................................... 320/144
See application file for complete search history.

METHOD, APPARATUS, AND DEVICE FOR CHARGING A BATTERY AND STORAGE MEDIUM

CROSS-REFERENCE TO RELATED APPLICATION

This application is a divisional application of U.S. patent application Ser. No. 16/134,054, filed on Sep. 18, 2018, which claims priority to Chinese Patent Application No. 201710891604.3, filed on Sep. 27, 2017. The aforementioned patent applications are hereby incorporated by reference in their entireties.

FIELD

The present disclosure relates to the technical field of batteries, and in particular, to a method, apparatus, and device for charging a battery, and storage medium.

BACKGROUND

At present, with the gradual consumption of non-renewable energy such as oil and with the urgent need for environment protection, the development of new energy industry has drawn great attention. One of the key and core technologies of the new energy industry is the battery. New energy vehicles which use rechargeable batteries as power source have achieved rapid development in recent years, the proportion of new energy vehicles in the vehicles all over the world is gradually expanded, and they are widely used in large and medium-sized cities, which is an important part of developing the electric vehicle industry and realizing advanced manufacturing in our country.

Most of the current electric vehicles use charging piles to charge a battery at a constant current. When adopting the charging method, since under different states of charge (SOCs), a rechargeable battery can actually bear different charging currents, resulting in that the charging efficiency of constant current charging is relatively low. In addition, if the rechargeable battery is charged under too high or too low a temperature, the method of constant current charging may have a negative effect on the service life of the battery.

SUMMARY

According to an aspect of the embodiments of the present disclosure, there is provided a method for charging a battery. The method for charging a battery includes acquiring a battery temperature of the battery; determining a charging current value $I_n$ for the $n^{th}$ charging stage of the battery, according to the acquired battery temperature and a preset mapping relationship between different temperature ranges and charging current values I, wherein $1<n \leq N$, N is the total number of charging stages, and a preset charging cut-off voltage value $V_n$ for the $n^{th}$ charging stage is greater than $V_{n-1}$; charging the battery with $I_j$ in the $j^{th}$ charging stage, wherein $1 \leq j \leq N$; acquiring a voltage value of the battery at the current time; if the voltage value at the current time is less than $V_j$, continuing to charge the battery with $I_j$; if the voltage value at the current time is not less than $V_j$ and j<N, charging the battery with if the voltage value at the current time is not less than $V_j$ and j=N, stopping charging the battery.

According to another aspect of the embodiments of the present disclosure, there is provided an apparatus for charging a battery. The apparatus for charging a battery includes a battery temperature acquiring unit configured to acquire a battery temperature of the battery; a charging current determining unit configured to determine a charging current value $I_n$ for the $n^{th}$ charging stage of the battery, according to the acquired battery temperature and a preset mapping relationship between different temperature ranges and charging current values I, wherein $1<n \leq N$, N is the total number of charging stages, and a preset charging cut-off voltage value $V_n$ for the $n^{th}$ charging stage is greater than $V_{n-1}$; a charging unit configured to charge the battery with $I_j$ in the $j^{th}$ charging stage, wherein $1 \leq j \leq N$; a current voltage value acquiring unit configured to acquire a voltage value of the battery at the current time; wherein the charging unit is further configured to: if the voltage value at the current time is less than $V_j$, continue to charge the battery with $I_j$; if the voltage value at the current time is not less than $V_j$ and j<N, charge the battery with $I_{j+1}$; if the voltage value at the current time is not less than $V_j$ and j=N, stop charging the battery.

According to yet another aspect of the embodiments of the present disclosure, there is provided a device for charging a battery. The device for charging a battery includes a memory and a processor. The memory is configured to store executable program codes. The processor is configured to read the executable program codes stored in the memory to perform the method for charging a battery according the embodiments of the present disclosure.

According to a further aspect of the embodiments of the present disclosure, there is provided a computer-readable storage medium having computer instructions stored thereon which, when executed on a computer, cause the computer to perform the method for charging a battery according the embodiments of the present disclosure.

BRIEF DESCRIPTION OF THE DRAWINGS

Other features, objects, and advantages of the present disclosure will become more apparent by reading the following detailed descriptions of non-limiting embodiments with reference to the accompanying drawings, in which the same or similar reference signs denote the same or similar features.

DETAILED DESCRIPTION

Figure 1:
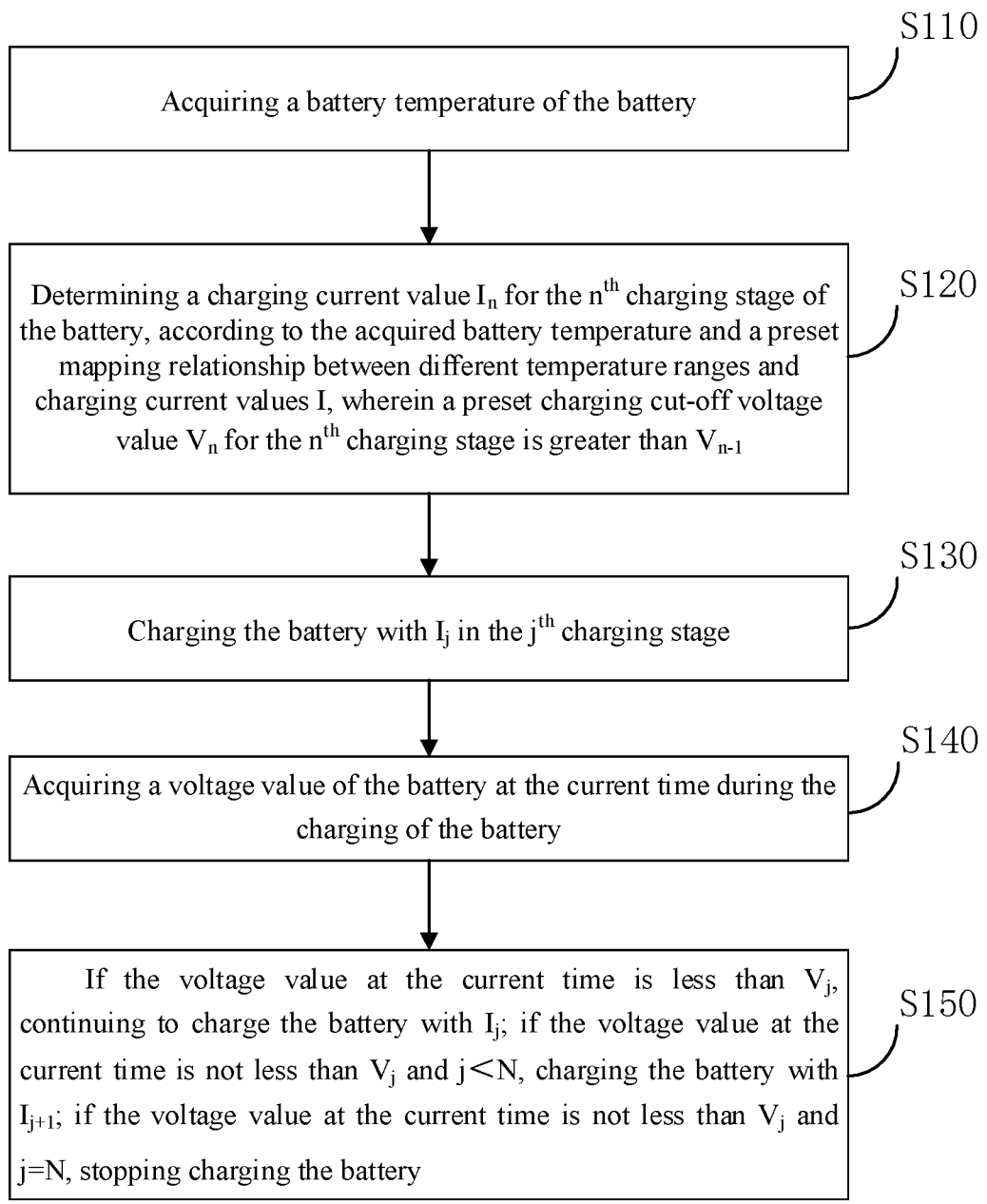
FIG. 1 is a schematic flow chart of a method for charging a battery according to an embodiment of the present disclosure.

The features and exemplary embodiments of the various aspects of the present disclosure will be described in detail below. In the following detailed description, numerous specific details are set forth in order to provide a thorough understanding of the present disclosure. It will be apparent, however, to those skilled in the art that the present disclosure may be practiced without some of these specific details. The following description of embodiments is only provided by illustrating examples for a better understanding of the present disclosure. The present disclosure is by no means limited to any of the specific configurations and algorithms set forth below, but covers any alterations, substitutions and improvements of elements, components and algorithms without departing from the spirit of the present disclosure. In the drawings and the following description, at least a part of well-known structures and techniques are not shown in order to avoid unnecessarily obscuring the present disclosure.

For a better understanding of the present disclosure, a method, apparatus, and device for charging a battery according to the embodiments of the present disclosure will be described in detail below with reference to the drawings. It should be noted that these embodiments are not intended to limit the scope of the present disclosure.

FIG. 1 illustrates a schematic flow chart of a method for charging a battery according to an embodiment of the present disclosure. As shown in FIG. 1, the method for charging a battery according to the present embodiment may include the following steps.

In step S110, a battery temperature of the battery may be acquired.

In step S120, a charging current value $I_n$ for the $n^{th}$ charging stage of the battery may be determined according to the acquired battery temperature and a preset mapping relationship between different temperature ranges and charging current values I, wherein a preset charging cut-off voltage value $V_n$ for the $n^{th}$ charging stage is greater than $V_{n-1}$.

In the embodiments of the present disclosure, the battery temperature is one of the most important parameters for charging the rechargeable battery. Under different battery temperatures, the optimal charging current required by the battery is not the same. Thus, using the method of constant current charging under too high or too low a temperature may have a negative effect on battery charging performance and battery life. Therefore, in order to improve the charging efficiency and extend battery life, this parameter, namely the battery temperature, needs to be considered.

In the embodiments of the present disclosure, before charging the battery, first, $I_n$ of the battery may be determined according to the acquired battery temperature and a preset mapping relationship between different temperature ranges and I, wherein $1 < n \leq N$, and N is the total number of charging stages. In the embodiments of the present disclosure, $I_n$ and $V_n$ are in one-to-one correspondence, that is, each charging stage may correspond to one charging current value and one charging cut-off voltage value. As the charging stages increases, the charging cut-off voltage value increases.

In some embodiments, the battery temperature may be acquired by arranging a temperature sensor on the battery.

In a preferred embodiment of the present disclosure, $I_n < I_{n-1}$, that is to say, as the charging stage increases, the charging cut-off voltage value is increased and the charging current value is decremented.

At present, during an actual process of charging a battery, as the charging time increases, the battery power and SOC are also increasing, and thus the bearing capacity of the battery for the charging current value will decline. Using decreasing charging current value as the charging stage increases will make the charging effect of the battery better and is more conducive to increase the battery power.

In the embodiments of the present disclosure, the mapping relationship described above is a mapping relationship between different temperature ranges and N charging current values for N charging stages, that is, I corresponding to each temperature range may include N charging current values. After the battery temperature is acquired, a charging current value of the battery may be determined according to the preset mapping relationship.

For example, in an embodiment of the present disclosure, it is assumed that the charging stages of the battery may be divided into four charging stages, that is, N=4. Table 1 shows a mapping relationship between different temperature ranges and four charging current values for four charging stages.

TABLE 1

| Temperature range | Charging current value | | | |
|---|---|---|---|---|
| −10° C.-0° C. | 60 A | 55 A | 25 A | 12 A |
| 0° C.-12° C. | 71 A | 68 A | 33 A | 15 A |
| 12° C.-25° C. | 78 A | 75 A | 36 A | 16 A |
| 25° C.-45° C. | 88 A | 84 A | 41 A | 18 A |

In Table 1, the column of the temperature range indicates a plurality of different temperature ranges. Specifically, four temperature ranges are illustrated, that is, −10° C.-0° C., 0° C.-12° C., 12° C.-25° C. and 25° C.-45° C. Each temperature range may correspond to charging current values for four charging stages. For example, charging current values for four charging stages corresponding to a temperature range of −10° C.-0° C. are 60 A A (charging current value for the first charging stage), 55 A (charging current value for the second charging stage), 25 A (charging current value for the third charging stage), and 12 A (charging current value for the fourth charging stage) respectively. Charging current values for four charging stages corresponding to the temperature range of 0° C.-12° C. are 71 A, 68 A, 33 A and 15 A respectively.

In the embodiments of the present disclosure, determining $I_n$ of the battery, according to the acquired battery temperature and a preset mapping relationship between different temperature ranges and I may include: determining a temperature range in which the battery temperature is located; determining a charging current value for the $n^{th}$ charging stage for the temperature range in which the battery temperature is located as the $I_n$, according to the mapping relationship In particular, a temperature range in which the battery temperature is located may be determined first, and then charging current values (N charging current values for N stages) for the temperature range in which the battery temperature is located may be determined according to the above mapping relationship. A charging current value for the $n^{th}$ charging stage in the determined charging current values is namely the $I_n$ of the battery at the above battery temperature.

For example, for the mapping relationship shown in Table 1 above, assuming that the battery temperature is 15° C., then the temperature range in which 15° C. is located may be 12° C.-25° C. Therefore, charging current values for four charging stages of the battery at 15° C. are respectively 78 A, 75 A, 36 A and 16 A, that is, $I_1$ is 78 A, $I_2$ is 75 A, $I_3$ is 36 A and $I_4$ is 16 A.

In practical applications, if the battery temperature is the common end value of two temperature ranges, charging current values corresponding to one of the temperature ranges may be randomly selected as the charging current value of the battery at the battery temperature. Charging current values of the battery at the battery temperature may also be determined according to a preset condition. For example, charging current values corresponding to a temperature range with higher temperatures in the two temperature ranges may be determined as charging current values of the battery.

In the embodiments of the present disclosure, before determining $I_n$ of the battery, the method may further include setting the mapping relationship between different temperature ranges and I.

In an embodiment of the present disclosure, setting the mapping relationship between different temperature ranges and I may further include: setting charging cut-off voltage values V; dividing the V into charging cut-off voltage intervals, wherein a minimum voltage value for the $n^{th}$ interval of the charging cut-off voltages is $V_{n-1}$, and a maximum voltage value for the $n^{th}$ interval is $V_n$, and a minimum voltage value for the $1^{st}$ interval is a preset lower limit voltage value; determining the charging current value for the $n^{th}$ charging stage for the different temperature ranges, according to the $n^{th}$ interval and the different temperature ranges; and establishing a mapping relationship between the different temperature ranges and the charging current value for the $n^{th}$ charging stage for the different temperature ranges.

In this embodiment, first, N charging cut-off voltage values V for N charging stages may be set according to a selected battery system, and V may be divided into charging cut-off voltage intervals. A minimum voltage value for the $n^{th}$ interval of the charging cut-off voltages is $V_{n-1}$, and a maximum voltage value for the $n^{th}$ interval is $V_n$, and a minimum voltage value for the $1^{st}$ interval is a preset lower limit voltage value. That is, a minimum voltage value for the first interval of the charging cut-off voltages is a preset lower limit voltage value, and a maximum voltage value for the first interval is a charging cut-off voltage value $V_1$ for the first charging stage; a minimum voltage value for the second interval is $V_1$, and a maximum voltage value for the second interval is $V_2$. Similarly, a minimum voltage value for the $n^{th}$ interval is $V_{n-1}$, a maximum voltage value for the $n^{th}$ interval is $V_n$, a minimum voltage value for the $N^{th}$ interval is $V_{N-1}$, a maximum voltage value for the $N^{th}$ interval is $V_N$.

After dividing into charging cut-off voltage intervals, charging current values for the $n^{th}$ charging stage for the different temperature ranges may be determined according to the $n^{th}$ interval and the different temperature ranges, namely, the $n^{th}$ interval may correspond to charging current values for the $n^{th}$ charging stage, and for each temperature range, the $n^{th}$ interval may correspond to one charging current value for the $n^{th}$ charging stage. After determining charging current values for the $n^{th}$ charging stage for different temperature ranges, a mapping relationship between different temperature ranges and the charging current values for the $n^{th}$ charging stage for the different temperature ranges may be established.

It can be seen that, in fact, the mapping relationship in the embodiments of the present disclosure actually may include a correspondence relationship among charging cut-off voltage values V, temperature ranges and charging current values, that is, charging cut-off voltage values V and one temperature range may correspond to a set of charging current values I, charging cut-off voltage values V and another temperature range may correspond to another set of charging current values I.

Determining the charging current values for the $n^{th}$ charging stage for different temperature ranges according to the $n^{th}$ interval and the different temperature ranges may be done through experimental values and/or empirical values. For example, optimal charging current values corresponding to the $n^{th}$ interval for different temperature ranges may be obtained through experiments, and the optimal charging current values obtained by the experiments may be determined as the charging current values for the $n^{th}$ charging stage corresponding to the $n^{th}$ interval for different temperature ranges.

For example, in the first interval where a voltage range is between the lower limit voltage value and the charging cut-off voltage $V_1$ for the first charging stage, an optimal charging current value obtained through experiments at a temperature range of 0° C.-12° C. may be 71 A, then 71 A may be determined as a charging current value for the first charging stage at the temperature range of 0° C.-12° C.

Figure 2:
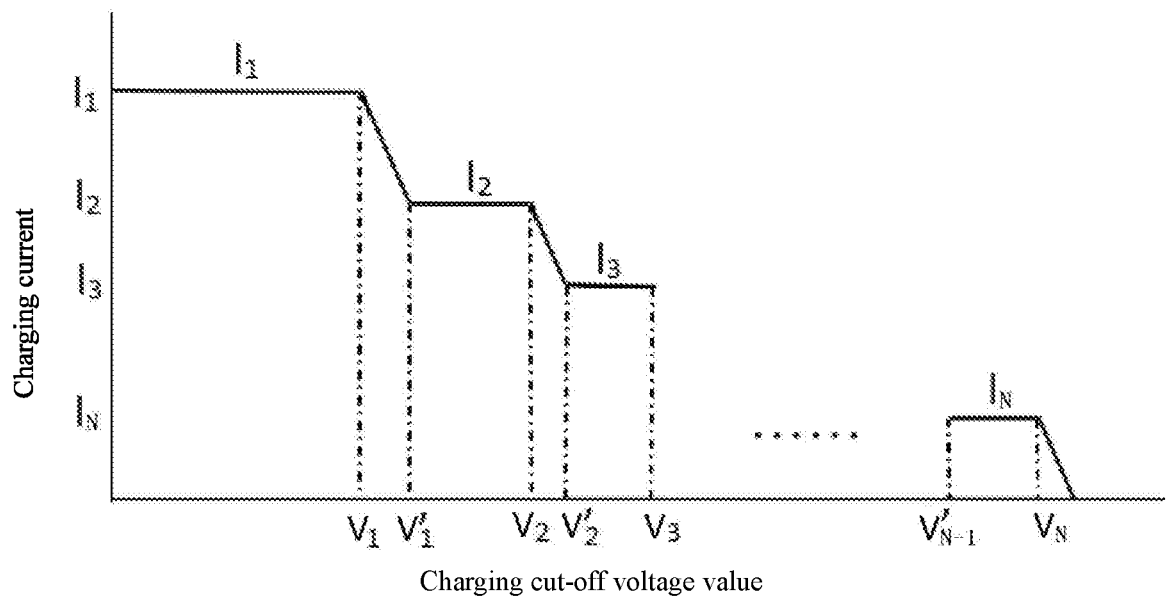
FIG. 2 is a schematic diagram of a preset mapping relationship between a temperature range and I according to an embodiment of the present disclosure.

FIG. 2 illustrates a schematic diagram of a preset mapping relationship between a temperature range of $T_1$-$T_2$ and charging current values I for the temperature range in the method for charging a battery according to embodiments of the present disclosure. In FIG. 2, $V_1$, $V_2$, ..., $V_N$ respectively represent a preset charging cut-off voltage value for the first charging stage, a preset charging cut-off voltage value for the second charging stage, ..., and a preset charging cut-off voltage value for the $N^{th}$ charging stage. N charging cut-off voltage intervals divided according to preset charging cut-off voltage values may be namely, the lower limit voltage value-$V_1$ (the first interval), $V_1$-$V_2$ (the second interval), $V_2$-$V_3$ (the third interval), ..., $V_{n-1}$-$V_n$ (the $n^{th}$ interval), ..., $V_{N-1}$-$V_N$ (the $N^{th}$ interval). $I_1$, $I_2$, ..., $I_N$ respectively represent, at the temperature range of $T_1$-$T_2$, a charging current value for the first charging stage, a charging current value for the second charging stage, ..., and a charging current value for the $N^{th}$ charging stage.

After determining a charging current value for each charging stage at the temperature range of $T_1$-$T_2$, a mapping relationship between the temperature range of $T_1$-$T_2$ and N charging current values I for the temperature range may be determined, to obtain a mapping relationship between a temperature range and I. Repeating the above method of establishing a mapping relationship, a mapping relationship between different temperature ranges and I for different temperature ranges may be obtained.

In step S130, in the $j^{th}$ charging stage, the battery may be charged with $I_j$.

After the $I_n$ of the battery is determined according to the battery temperature and the above mapping relationship, the battery may be charged in multiple stages. In the $j^{th}$ charging stage, the battery may be charged with $I_j$, wherein $1 \leq j \leq N$.

In step S140, a voltage value of the battery at the current time during the charging of the battery may be acquired.

In step S150, if the voltage value at the current time is less than $V_j$, then the battery may continue to be charged with $I_j$; if the voltage value at the current time is not less than $V_j$ and $j<N$, then the battery may be charged with $I_{j+1}$; and if the voltage value at the current time is not less than $V_j$ and $j=N$, then the charging of the battery may be stopped.

Under different voltage values, a rechargeable battery can actually bear different charging currents, therefore during the charging of the battery, a voltage value of the battery is also a charging parameter that needs to be considered. In the embodiments of the present disclosure, during the charging of the battery, a voltage value of the battery at the current time during the charging of the battery may be acquired, and then a current charging state of the battery may be determined by comparing the voltage value at the current time with the charging cut-off voltage value for a charging stage in which the battery is located at the current time.

In the embodiments of the present disclosure, during the charging of the battery with $I_j$ in the $j^{th}$ charging stage, a current voltage value of the battery may be acquired, and if the voltage value at the current time is less than a charging cut-off voltage value $V_j$ for the $j^{th}$ charging stage, then the battery may continue to be charged with $I_j$; if the voltage value at the current time is not less than Vj and $j<N$ (the $j^{th}$ charging stage at this time is not the last charging stage), then the battery may be charged with $I_{j+1}$; and if the voltage value at the current time is not less than $V_j$ and $j=N$ (the $j^{th}$ charging stage at this time is the last charging stage), then the charging of the battery may be stopped.

It should be noted that, in the embodiments of the present disclosure, the current time of the battery during the charging of the battery may be set according to actual needs, that is, acquiring a voltage value of the battery at which one or more specified moments during the charging process may be set as required. For example, the acquisition of a voltage value during the process of charging the battery may be performed at a preset time interval (for example, 3 minutes). At this time, a voltage value at the current time during the charging of the battery may be obtained every 3 minutes. For another example, a voltage value of the battery at the current time may also be acquired in real time during the charging process, that is, a voltage value of the battery during the charging of the battery may be monitored in real time.

In the embodiments of the present disclosure, charging the battery with $I_{j+1}$ may include: controlling $I_j$ to change to $I_{j+1}$ at a predetermined rate, and charging the battery with $I_{j+1}$.

During an actual process of charging the battery, when entering the $(j+1)^{th}$ charging stage from the $j^{th}$ charging stage, the charging current $I_j$ will not momentarily change to $I_{j+1}$, and instead, will gradually change to a charging current value for the next charging stage. Accordingly, when charging the battery is stopped, the charging current value will gradually decrease from $I_N$ to 0.

In the embodiments shown in FIG. 2, in embodiments where $I_n<I_{n-1}$, namely a charging current value decreases as the charging stage increases, during the change of the charging current value from $I_n$ to $I_{n+1}$, the voltage value of the battery increases from $V_n$ to $V'_n$. In particular, when entering the second charging stage from the first charging stage, a charging current value $I_1$ will gradually decrease to a charging current value $I_2$, and the voltage value of the battery increases from a charging cut-off voltage value $V_1$ for the first charging stage to $V'_1$.

In a specific embodiment of the present disclosure, charging the battery with $I_j$ may include: acquiring a voltage value before charging the battery; determining a charging cut-off voltage value in the charging cut-off voltage values that is greater than the voltage value before charging the battery and has a smallest difference from the voltage value before charging the battery; determining a charging cut-off current value corresponding to the determined charging cut-off voltage value as $I_j$; and charging the battery with $I_j$.

In this embodiment, before charging the battery, first, an initial charge current value of the battery may be determined according to the voltage value before charging the battery, that is, after determining the charge current value $I_n$ for the $n^{th}$ charging stage of the battery, an initial charging current value in $I_n$ for charging the battery may further be determined. Specifically, first, a charging cut-off voltage value in the charging cut-off voltage values that is greater than the voltage value before charging the battery and has a smallest difference from the voltage value before charging the battery may be determined according to the voltage value before charging the battery and preset charging cut-off voltage values V. Then, a charging cut-off current value corresponding to the determined charging cut-off voltage value may be determined as $I_j$, namely a charging cut-off current value for a charging stage corresponding to the determined charging cut-off voltage value may be determined as $I_j$, and the battery may be charged with $I_j$.

For example, in one specific embodiment, a temperature range in which the battery temperature is located may be a temperature range in the mapping relationship shown in FIG. 2. The voltage value before charging the battery may locate in the second interval of charging cut-off voltages, that is, an interval of charging cut-off voltages where a minimum voltage value may be $V_1$ and a maximum voltage value may be $V_2$. Therefore, $V_2$ is a charging cut-off voltage value that is greater than the voltage value before charging the battery and has a smallest difference from the voltage value before charging the battery, wherein $V_2$ is a charging cut-off voltage value for the second charging stage. Therefore, a charging current value corresponding to $V_2$ may be namely a charging current value $I_2$ for the second charging stage, and then the battery may start to be charged with $I_2$ at this time.

It should be noted that a specific implementation of acquiring a voltage value of the battery (for example, acquiring a voltage value before charging the battery and acquiring a voltage value at the current time during the charging of the battery) is the prior art and will not be described in detail herein.

The battery described in the embodiments of the present disclosure may be a battery in which both a positive electrode and a negative electrode are capable of releasing and receiving an energy-carrying particle, including but not limited to a nickel cobalt manganese (NCM) power storage unit. In terms of scale, the battery described in the embodiments of the present disclosure may be a battery cell, or may be a battery module or a battery pack, which will not be limited herein.

For rechargeable batteries of different systems, battery charge and discharge characteristics are different. For a battery of NCM system, the battery voltage platform is relatively linear, monitoring a voltage is easier than monitoring a SOC, therefore using a voltage value may characterize a battery charging depth well and adjust the battery charging rate. Therefore, the method for charging a battery provided by the embodiments of the present disclosure is particularly suitable for a battery of the NCM system, that is, the NCM power storage unit described above.

The method for charging a battery provided by the embodiments of the present disclosure adopts a multi-stage and step-by-step charging method which is associated with the battery temperature and is based on the voltage value of the battery. During the charging process, a charging state of the battery may be adjusted in real time according to a voltage value of the battery at the current time and the charging cut-off voltage values for respective charging stages. By adopting the method for charging a battery according to the embodiments of the present disclosure, not only the charging efficiency and the charging amount may be improved, but also the service life of the battery may be prolonged, and an allowable charging temperature range of a rechargeable battery may be expanded.

The method for charging a battery in the embodiments of the present disclosure and the improvements of the method for charging a battery described above over an existing method for charging a battery will be described in detail below with reference to a specific embodiment 1, a specific comparative embodiment 1, a specific embodiment 2 and a specific comparative embodiment 2.

The specific embodiment 1 is as follows.

In this specific embodiment, charging stages of the battery may be set to four, four charging cut-off voltage values for the set four charging stages may be set as 3.8V, 4.1V, 4.23V, and 4.25V respectively, and a set lower limit voltage value may be 2.8V. A mapping relationship between charging cut-off voltage values for respective charging stages and charging current values for corresponding charging stages, and between preset different temperature ranges and four charging current values for four charging stages is shown in Table 2.

TABLE 2

| Temperature range | Charging cut-off voltage value | | | |
|---|---|---|---|---|
| | 3.8 V | 4.1 V | 4.23 V | 4.25 V |
| | Charging current value | | | |
| −10° C.-0° C. | 60 A | 55 A | 25 A | 12 A |
| 0° C.-12° C. | 71 A | 68 A | 33 A | 15 A |
| 12° C.-25° C. | 78 A | 75 A | 36 A | 16 A |
| 25° C.-45° C. | 88 A | 84 A | 41 A | 18 A |

When the battery needs to be charged, the battery temperature acquired in this embodiment is 15° C. According to the mapping relationship shown in Table 2, it can be seen that a temperature range in which the battery temperature of 15° C. is located is 12° C.-25° C. Therefore, charging current values for four charging stages of the battery at 15° C. may be 78 A, 75 A, 36 A, and 16 A respectively, which are denoted as {78 A, 75 A, 36 A, 16 A} in this embodiment for convenience of description. Charging cut-off voltage values for the four charging stages are denoted as {3.8V, 4.1V, 4.23V, 4.25V}, and the values in {78 A, 75 A, 36 A, 16 A} and the values in {3.8V, 4.1V, 4.23V, 4.25V} are in one-to-one correspondence.

In this embodiment, the voltage value before charging the battery may be 3.6V. Since 3.6V is located in the first interval of charging cut-off voltage values, namely an interval where a minimum voltage value is 2.8V and a maximum voltage value is 3.8V. Therefore, a charging current value 78 A for the first charging stage corresponding to a charging cut-off voltage for the first charging stage, namely 3.8V, may be an initial charging current value for starting to charge the battery.

During the charging of the battery, a voltage value of the battery at the current time may be collected in real time, and the voltage value $V_t$ at the current time t may be compared with $V_1$, namely 3.8V. If $V_t$<3.8V, the battery may continue to be charged with 78 A. During the charging process, the voltage value of the battery at the current time may be continuously acquired, and the voltage value at the current time may be continuously compared with 3.8V until the voltage value at the current time is equal to or greater than 3.8V, and then the battery is charged with 75 A. During the charging process, the voltage value at the current time may be acquired and compared with the $V_2$, namely 4.1V until the voltage value at the current time is equal to or greater than 4.1V, and then the battery may continue to be charged with a current of 36 A. During the charging process, the voltage value at the current time may be continuously acquired and compared with the 4.23V until the voltage value at the current time is equal to or greater than 4.23V, and then the battery may continue to be charged with a current of 16 A. During the charging process, the voltage value at the current time may be continuously acquired, until the voltage value at the current time is equal to or greater than 4.25V, charging the battery may be stopped.

Of course, during an actual charging process, a user may also control the end of the charging process as needed. For example, if the battery is disconnected from the charging power supply, the charging process may be ended.

The specific comparative embodiment 1 is as follows.

In the specific comparative embodiment 1, a charging cut-off voltage value of the battery may be set to 4.25V, the battery may be charged and discharged at a battery temperature of 15° C., and the battery may be charged with a constant current 43 A until the battery voltage value reaches 4.25V.

The method for charging a battery according to the specific embodiment 1 and the specific comparative embodiment 1 of the present disclosure will be described below with reference to FIGS. 3 and 4.

Figure 3:
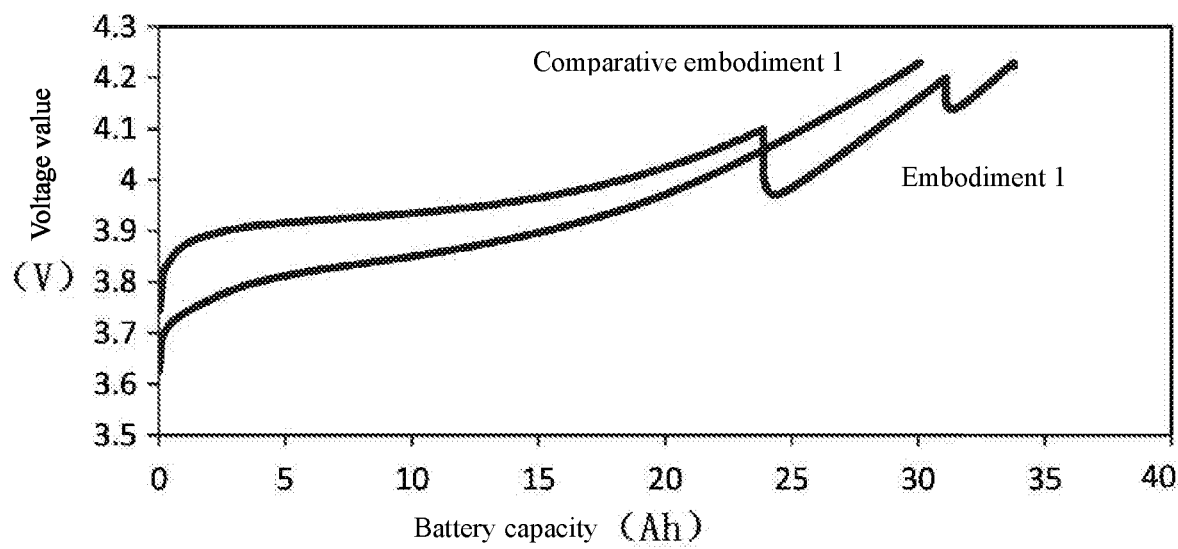
FIG. 3 is a schematic diagram of a comparison of curves of a battery capacity versus a battery voltage value during the charging of the battery in a specific embodiment 1 and a specific comparative embodiment 1 of the present disclosure.

FIG. 3 is a schematic diagram of a comparison of curves of a battery capacity versus a battery voltage value during the charging of the battery in the specific embodiment 1 and the specific comparative embodiment 1 of the present disclosure. It can be seen from FIG. 3 that, although charging of the specific embodiment 1 and the specific comparative embodiment 1 both do not exceed the charging cut-off voltage value, namely the upper limit voltage value of 4.25 V, the battery power in the specific embodiment 1 is higher as compared to the specific comparative embodiment 1. It can be seen that the method for charging a battery in the specific embodiment 1 of the present disclosure may charge more power into the battery.

Figure 4:
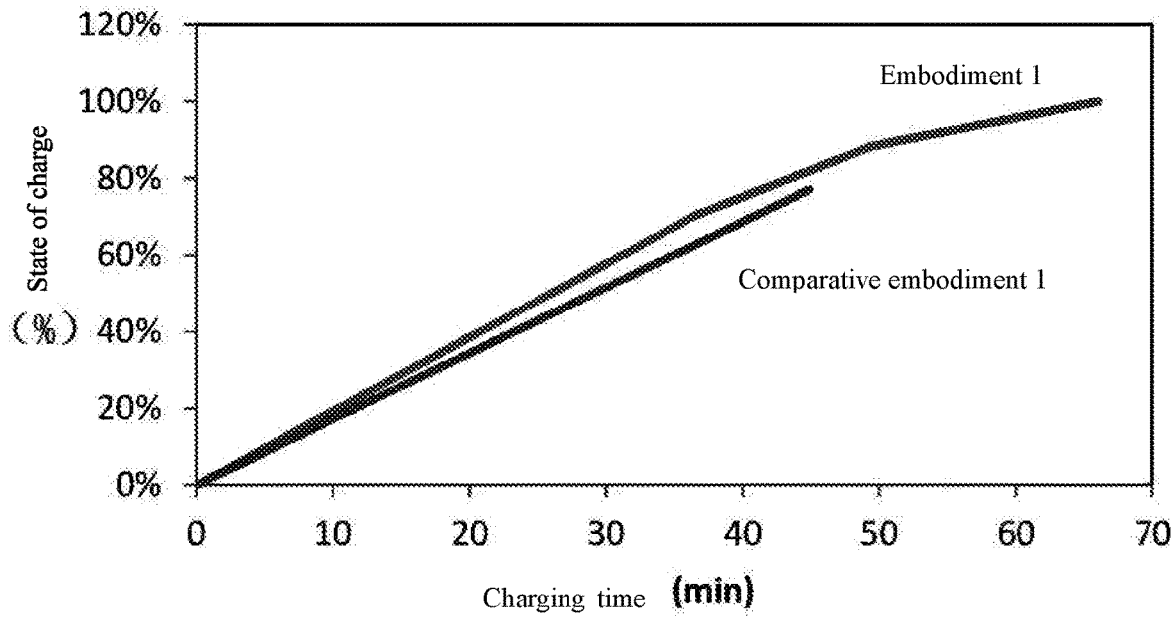
FIG. 4 is a schematic diagram of a comparison of curves of a SOC for a battery versus a charging time during the charging of the battery in a specific embodiment 1 and a specific comparative embodiment 1 of the present disclosure.

FIG. 4 is a schematic diagram of a comparison of curves of a SOC for a battery versus a charging time during the charging of the battery in a specific embodiment 1 and a specific comparative embodiment 1 of the present disclosure. It can be seen from FIG. 4 that, when a same SOC is reached, the charging time used in the specific embodiment 1 is shorter as compared to the specific comparative embodiment 1. It can be seen that, as compared to the specific comparative embodiment 1, the charging speed according to the method for charging a battery in the specific embodiment 1 of the present disclosure is faster.

The specific embodiment 2 is as follows.

In the specific embodiment, a mapping relationship between preset V, different temperature ranges and charging current values I for four charging stages is shown in Table 2 in the foregoing description.

When the battery needs to be charged, the battery temperature acquired in this embodiment is −10° C. According to the mapping relationship shown in Table 2, it can be seen that a temperature range in which the battery temperature of −10° C. is located is −10° C.-0° C. Therefore, charging current values for four charging stages of the battery at −10° C. may be {60 A, 55 A, 25 A, 12 A}, and the values in {60 A, 55 A, 25 A, 12 A} and the values in {3.8V, 4.1V, 4.23V, 4.25V} are in one-to-one correspondence.

In this embodiment, the voltage value before charging the battery may be 3.7V. Among charging cut-off voltage value {3.8V, 4.1V, 4.23V, 4.25V}, a charging cut-off voltage value that is greater than 3.7V and has a smallest difference from 3.7V is 3.8V. Therefore, at this time, a charging current value 60 A corresponding to $V_1$, namely 3.8V, may be an initial charging current value for starting to charge the battery in multi stages, until the voltage value of the battery at the current time is equal to or greater than 4.25V, charging the battery may be stopped.

The specific comparative embodiment 2 is as follows.

In the specific comparative embodiment 2, a charging cut-off voltage value of the battery may be set to 4.25V, the battery may be charged and discharged at a battery temperature of −10° C., and the battery may be charged with a constant current 43 A until the voltage value of the battery reaches 4.25V.

The method for charging a battery according to the specific embodiment 2 and the specific comparative embodiment 2 of the present disclosure will be described below with reference to FIG. 5 and FIG. 6.

Figure 5:
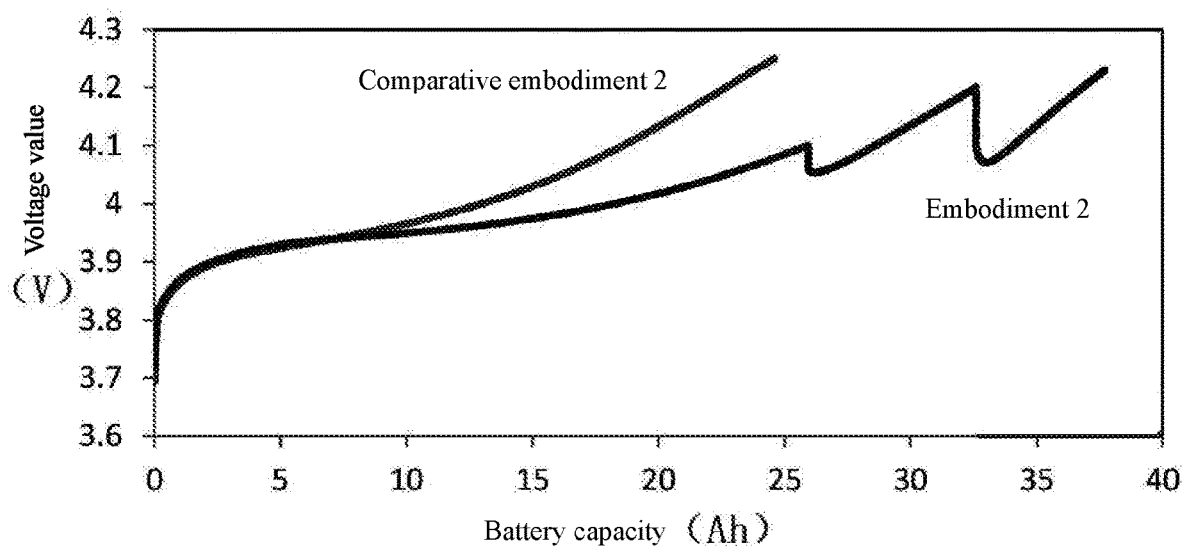
FIG. 5 is a schematic diagram of a comparison of curves of a battery capacity versus a battery voltage value during the charging of the battery in a specific embodiment 2 and a specific comparative embodiment 2 of the present disclosure.

FIG. 5 is a schematic diagram of a comparison of curves of a battery capacity versus a battery voltage value during the charging of the battery in a specific embodiment 2 and a specific comparative embodiment 2 of the present disclosure. It can be seen from FIG. 5 that, although charging of the specific embodiment 2 and the specific comparative embodiment 2 both do not exceed the charging cut-off voltage value, namely the upper limit voltage value of 4.25 V, the battery power in the specific embodiment 2 is higher as compared to the specific comparative embodiment 2. It can be seen that the method for charging a battery in the specific embodiment 2 of the present disclosure may charge more power into the battery.

Figure 6:
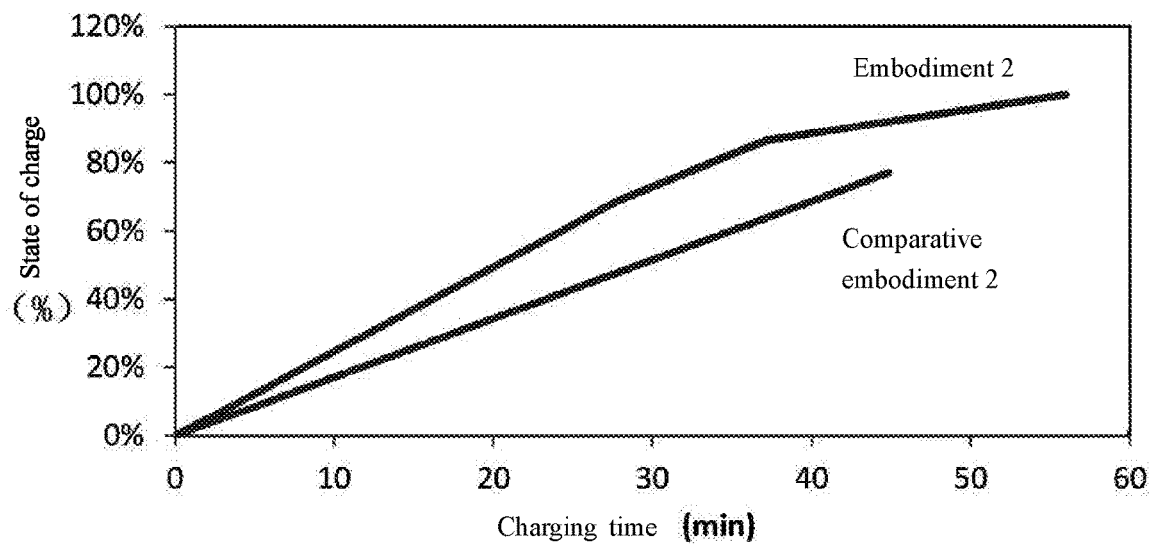
FIG. 6 is a schematic diagram of a comparison of curves of a SOC for a battery versus a charging time during the charging of the battery in a specific embodiment 2 and a specific comparative embodiment 2 of the present disclosure.

FIG. 6 is a schematic diagram of a comparison of curves of a SOC for a battery versus a charging time during the charging of the battery in a specific embodiment 2 and a specific comparative embodiment 2 of the present disclosure. It can be seen from FIG. 6 that, when a same SOC is reached, the charging time used in the specific embodiment 2 is shorter as compared to the specific comparative embodiment 2. It can be seen that, as compared to the specific comparative embodiment 2, the charging speed according to the method for charging a battery in the specific embodiment 2 of the present disclosure is faster.

In summary, as can be seen from the specific embodiment 1 and the specific comparative embodiment 1 as well as the specific embodiment 2 and the specific comparative embodiment 2 that, the method for charging a battery according to the specific embodiments of the present disclosure can improve the charging amount and the charging efficiency of the battery, and the method for charging a battery according to the embodiments of the present disclosure is suitable for charging a battery in multi stages at different battery temperatures.

The apparatus and device for charging a battery according to the embodiments of the present disclosure are described in detail below with reference to the accompanying drawings.

Figure 7:
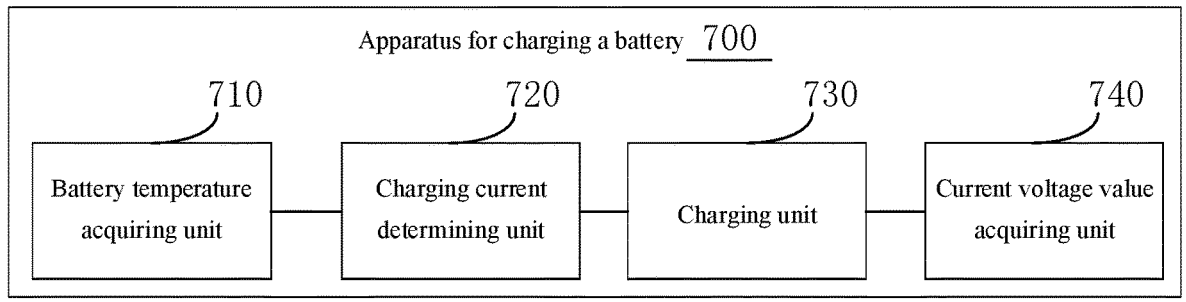
FIG. 7 is a schematic structural diagram of an apparatus for charging a battery according to an embodiment of the present disclosure.

FIG. 7 illustrates a schematic structural diagram of an apparatus for charging a battery according to an embodiment of the present disclosure. As shown in FIG. 7, the apparatus 700 for charging a battery may include a battery temperature acquiring unit 710, a charging current determining unit 720, a charging unit 730 and a current voltage value acquiring unit 740.

The battery temperature acquiring unit 710 may be configured to acquire a battery temperature of the battery.

The charging current determining unit 720 may be configured to determine $I_n$ according to the acquired battery temperature and a mapping relationship between different temperature ranges and I, wherein $1 < n \leq N$, N is the total number of charging stages, and $V_n > V_{n-1}$.

The charging unit 730 may be configured to charge the battery with $I_j$ in the $j^{th}$ charging stage, wherein $1 \leq j \leq N$.

The current voltage value acquiring unit 740 may be configured to acquire a voltage value of the battery at the current time.

The charging unit 730 may be further configured to: if the voltage value at the current time is less than $V_j$, continue to charge the battery with $I_j$; if the voltage value at the current time is not less than $V_j$ and j<N, charge the battery with $I_{j+1}$; if the voltage value at the current time is not less than $V_j$ and j=N, stop charging the battery.

The apparatus 700 for charging a battery provided by the embodiments of the present disclosure may correspond to an execution body in the method for charging a battery according to the embodiments of the present disclosure, and functions of the respective units in the apparatus 700 for charging a battery are respectively implemented in order to implement the respective processes of the method in FIG. 1, which will not be repeated herein for conciseness.

Figure 8:
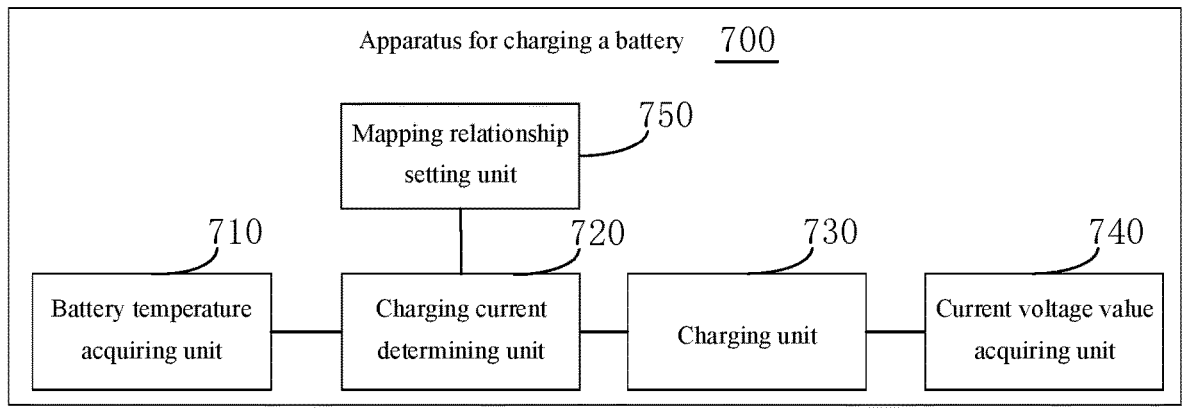
FIG. 8 is a schematic structural diagram of an apparatus for charging a battery according to another embodiment of the present disclosure.

In the embodiments of the present disclosure, the apparatus for charging a battery described above may further include a mapping relationship setting unit 750, as shown in FIG. 8.

The mapping relationship setting unit 750 may be configured to set the mapping relationship between the different temperature ranges and I.

In an embodiment of the present disclosure, the mapping relationship setting unit 750 may be further configured to: set charging cut-off voltage values V; divide the V into charging cut-off voltage intervals, wherein a minimum voltage value for the $n^{th}$ interval of the charging cut-off voltages is $V_{n-1}$, and a maximum voltage value for the $n^{th}$ interval is $V_n$, and a minimum voltage value for the $1^{st}$ interval is a lower limit voltage value of the battery; determine charging current values for the $n^{th}$ charging stage for the different temperature ranges, according to the $n^{th}$ interval and the different temperature ranges; establish a mapping relationship between the different temperature ranges and the charging current values for the $n^{th}$ charging stage for the different temperature ranges.

For a specific function implementation of the mapping relationship setting unit of the apparatus for charging a battery provided in the embodiments of the present disclosure, reference may be made to the specific implementation steps of the method for charging a battery provided in the foregoing embodiments of the present disclosure, which will not be repeated herein.

In an embodiment of the present disclosure, the charging unit 730 may be further configured to: acquire a voltage value before charging the battery; determine a charging cut-off voltage value in the charging cut-off voltage values that is greater than the voltage value before charging the battery and has a smallest difference from the voltage value before charging the battery; determine a charging cut-off current value corresponding to the determined charging cut-off voltage value as $I_j$; and charge the battery with $I_j$.

In this embodiment, when the battery is charged, the charging unit 730 may determine an initial charging current value of the battery according to the voltage value before charging the battery and the battery temperature, and may start to charge the battery with the determined initial charging current value. For a specific function implementation of the charging unit 730 in this embodiment, reference may be made to the corresponding description in the method for charging a battery in the foregoing embodiments of the present disclosure, which will not be repeated herein.

In an embodiment of the present disclosure, the charging current determining unit 720 may be further configured to: determine a temperature range in which the battery temperature is located; determine a charging current value for the $n^{th}$ charging stage for the temperature range in which the battery temperature is located as the $I_n$, according to the mapping relationship.

In an preferred embodiment of the present disclosure, $I_n < I_{n-1}$.

In an embodiment of the present disclosure, the charging unit 730 may be further configured to charge the battery with $I_{j+1}$ after controlling $I_j$ to change to $I_{j+1}$ at a predetermined rate.

The battery described in the apparatus for charging a battery provided by the embodiments of the present disclosure may include, but not limited to, a NCM power storage unit. In terms of scale, the battery described in the embodiments of the present disclosure may be a battery cell, or may be a battery module or a battery pack, which will not be limited herein.

Figure 9:
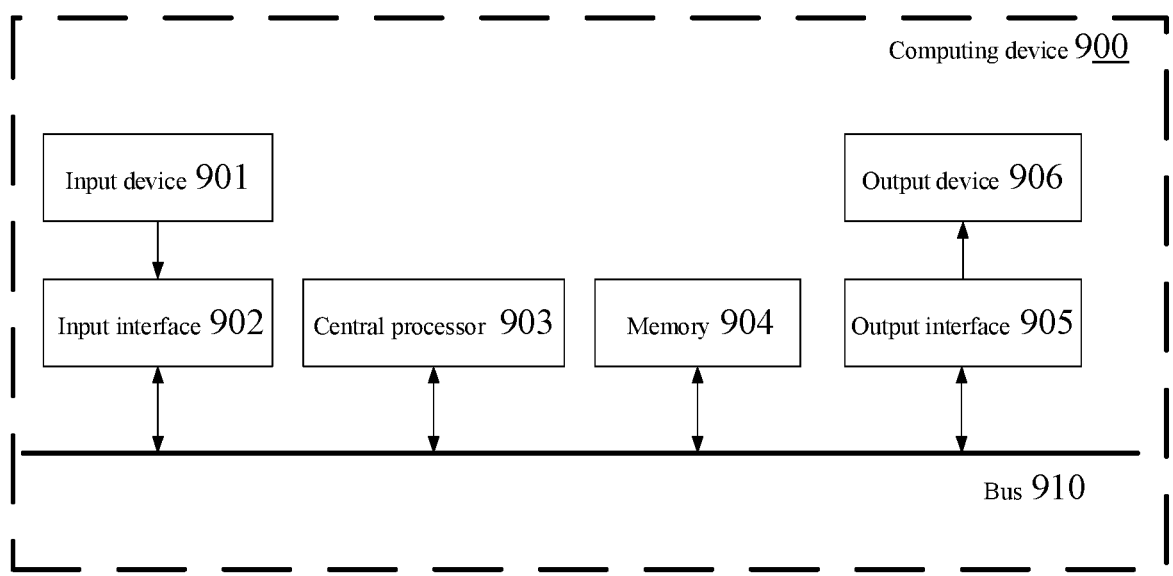
FIG. 9 is a structural diagram of an exemplary hardware architecture of a computing device that can implement the method and apparatus for charging a battery according to an embodiment of the present disclosure.

At least a portion of the method and apparatus for charging a battery described with reference to FIGS. 1-8 may be implemented by a computing device. FIG. 9 illustrates a schematic structural block diagram of a computing device according to an embodiment of the present disclosure. As shown in FIG. 9, the computing device 900 may include an input device 901, an input interface 902, a processor 903, a memory 904, an output interface 905, and an output device 906. The input interface 902, the processor 903, the memory 904, and the output interface 905 may be connected to each other through a bus 910. The input device 901 and the output device 906 may be connected to the bus 910 via the input interface 902 and the output interface 905 respectively, and thus may be connected to other components of the computing device 900. Specifically, the input device 901 may receive the input information from the outside (e.g., a preset charging current value and/or a preset battery charging voltage value for each charging stage during the charging of the battery), and transmit the input information to the processor 903 through the input interface 902. The processor 903 may process the input information based on computer-executable instructions stored in the memory 904 to generate output information and store the output information in the memory 904 temporarily or permanently, and then the output information may be transmitted through the output interface 905 to the output device 906. The output device 906 may output the output information to the outside of the computing device 900 for use by a user.

That is, the computing device 900 shown in FIG. 9 may be implemented as a device for charging a battery, which may include a processor 903 and a memory 904. The memory 904 may be configured to store executable program codes. The processor 903 may be configured to read executable program codes stored in the memory to perform the method for charging a battery in the foregoing embodiments.

Here, the processor may communicate with a battery management system and a voltage sensor mounted on a power battery to execute computer-executable instructions based on relevant information from the battery management system and/or the voltage sensor, to implement the method and apparatus for charging a battery described in conjunction with FIGS. 1-8.

With the device for charging a battery in the embodiments of the present disclosure, the battery charging speed and the charging amount can be improved, the service life of the battery can be prolonged, and the allowable charging temperature range of the battery can be expanded.

In the embodiments of the present disclosure, there is also provided a computer-readable storage medium having computer instructions stored thereon which, when executed on a computer, cause the computer to perform the method for charging a battery of any one of the embodiments of the present disclosure.

The above embodiments may be implemented in whole or in part by software, hardware, firmware, or any combination thereof. When implemented in hardware, it may for example be an electronic circuit, an application specific integrated circuit (ASIC), a suitable firmware, a plug-in, a function card or the like. When implemented in software, it may be implemented in whole or in part in the form of a computer program product or a computer-readable storage medium. The computer program product or computer-readable storage medium may include one or more computer instructions. When the computer program instructions are loaded and executed on a computer, the processes or functions according to the embodiments of the present disclosure are generated in whole or in part. The computer may be a general purpose computer, a special purpose computer, a computer network, or other programmable devices. The computer instructions may be stored in a computer-readable storage medium or transferred from one computer-readable storage medium to another, for example, transferred from a website site, a computer, a server, or a data center to another web site, computer, server, or data center in a wired (such as a coaxial cable, optical fiber, digital subscriber line (DSL)) or wireless (such as infrared, wireless, microwave, etc.) manner. The computer-readable storage medium may be any available medium that can be accessed by a computer or may include a data storage device such as a server, a data center etc. that are integrated with one or more available media. The available medium may be a magnetic medium such as a floppy disk, a hard disk, a magnetic tape, an optical medium such as a DVD, or a semiconductor medium such as a solid state disk (SSD).

It should be noted that, in the present disclosure, relational terms such as first and second are merely used to distinguish one entity or operation from another entity or operation, and do not necessarily require or imply that there is any such actual relationship or order between these entities or operations. Moreover, the terms "include", "comprise", or any other variation thereof are intended to cover a non-exclusive inclusion, such that a process, method, article, or apparatus that includes a list of elements may include not only those elements but also other elements that are not specifically listed, or may include elements that are inherent to such process, method, article, or device. Without further limitations, elements defined by the statement "include . . . " do not exclude the existence of additional identical elements in the process, method, article, or apparatus that includes the elements.

It should also be noted that the exemplary embodiments mentioned in the present disclosure describe some methods or systems based on a series of steps or devices. However, the present disclosure is not limited to the order of the above steps, that is, the steps may be performed in the order mentioned in the embodiments, or may be performed in a different order than that in the embodiments or several steps may be performed simultaneously.

The present disclosure may be embodied in other specific forms without departing from the spirit and essential characteristics thereof. For example, the algorithms described in the specific embodiments may be modified without departing from the basic spirit of the disclosure. The present embodiments are therefore to be considered in all respects as illustrative and not restrictive. The scope of the present disclosure is defined by the appended claims rather than by the foregoing description, and all changes falling within the scope of the meaning and equivalents of the claims within the scope are thus intended to be included in the scope of the present disclosure.

What is claimed is:

1. A method for charging a battery, comprising:
   acquiring a first voltage value of the battery, the first voltage value is a voltage value of the battery before charging;
   determining a charging cut-off voltage value $V_j$ corresponding to the first voltage value;
   determining a charging cut-off current value $I_j$ corresponding to the charging cut-off voltage value;
   charging the battery with $I_j$;
   in a $j^{th}$ charging stage, wherein $1 \leq j \leq N$, and N is a total number of charging stages,
      acquiring a second voltage value of the battery at current time;
      charging the battery with $I_{j+1}$ if the second voltage value is not less than $V_j$ and j<N; and
   wherein determining the charging cut-off current value $I_j$ further comprises:
      acquiring a battery temperature of the battery;
      determining the charging cut-off current value $I_j$ according to the acquired battery temperature, the charging cut-off voltage value $V_j$ and a preset mapping relationship, wherein the preset mapping relationship comprises a correspondence relationship among charging cut-off voltage values, different temperature ranges and charging cut-off current values.

2. The method of claim 1, wherein determining the charging cut-off voltage value $V_j$ further comprises:
   selecting a charging cut-off voltage value in a plurality of charging cut-off voltage values that is greater than the first voltage value and has a smallest difference from the first voltage value.

3. The method of claim 1, further comprising:
   continuing to charge the battery with $I_j$ if the second voltage value is less than $V_j$.

4. The method of claim 1, further comprising:
   stopping charging the battery if the second voltage value is not less than $V_j$ and j=N.

5. The method of claim 1, wherein before determining the charging cut-off current value $I_j$, the method further comprises:
   setting the correspondence relationship among the charging cut-off voltage values, the different temperature ranges and the charging cut-off current values.

6. The method of claim 5, wherein setting the correspondence relationship among the charging cut-off voltage values, the different temperature ranges and the charging cut-off current values comprises:
   setting charging cut-off voltage values V;
   dividing the V into charging cut-off voltage intervals, wherein a minimum voltage value for a $n^{th}$ interval of the charging cut-off voltages is $V_{n-1}$, and a maximum voltage value for the $n^{th}$ interval is $V_n$, and a minimum voltage value for the $1^{st}$ interval is a preset lower limit voltage value;
   determining charging cut-off current values for a $n^{th}$ charging stage for the different temperature ranges, according to the $n^{th}$ interval and the different temperature ranges;
   establishing the correspondence relationship among the charging cut-off voltage values, the different temperature ranges and the charging cut-off current values.

7. The method of claim 1, wherein determining the charging cut-off current value $I_j$ according to the acquired battery temperature, the charging cut-off voltage value $V_j$ and the preset mapping relationship comprises:
   determining a temperature range in which the battery temperature is located;
   determining the charging cut-off current value $I_j$ according to the temperature range, the charging cut-off voltage value $V_j$ and the preset mapping relationship.

8. The method of claim 1, wherein charging the battery with $I_{j+1}$ comprises:
   charging the battery with $I_{j+1}$ after controlling $I_j$ to change to $I_{j+1}$ at a predetermined rate.

9. The method of claim 1, wherein the battery comprises a nickel cobalt manganese power storage unit.

10. An apparatus for charging a battery, comprising:
    a processor;
    a memory for storing processor-executable program codes; and
    wherein the processor is configured to:
       acquire a first voltage value of the battery, the first voltage value is a voltage value of the battery before charging;
       determine a charging cut-off voltage value $V_j$ corresponding to the first voltage value;
       determine a charging cut-off current value $I_j$ corresponding to the charging cut-off voltage value;
       charge the battery with $I_j$;
       in a $j^{th}$ charging stage, wherein $1 \leq j \leq N$, and N is a total number of charging stages,
          acquire a second voltage value of the battery at current time;
          charge the battery with $I_{j+1}$ if the second voltage value is not less than $V_j$ and j<N; and
    wherein the processor is further configured to:
       acquire a battery temperature of the battery;
       determine the charging cut-off current value $I_j$ according to the acquired battery temperature, the charging cut-off voltage value $V_j$ and a preset mapping relationship, wherein the preset mapping relationship comprises a correspondence relationship among charging cut-off voltage values, different temperature ranges and charging cut-off current values.

11. The apparatus of claim 10, wherein the processor is further configured to:
select a charging cut-off voltage value in a plurality of charging cut-off voltage values that is greater than the first voltage value and has a smallest difference from the first voltage value.

12. The apparatus of claim 10, wherein the processor is further configured to:
continue to charge the battery with $I_j$ if the second voltage value is less than $V_j$.

13. The apparatus of claim 10, wherein the processor is further configured to:
stop charging the battery if the second voltage value is not less than $V_j$ and j=N.

14. The apparatus of claim 10, wherein the processor is further configured to:
set the correspondence relationship among the charging cut-off voltage values, the different temperature ranges and the charging cut-off current values.

15. The apparatus of claim 14, wherein the processor is further configured to:
set charging cut-off voltage values V;
divide the V into charging cut-off voltage intervals, wherein a minimum voltage value for a $n^{th}$ interval of the charging cut-off voltages is $V_{n-1}$, and a maximum voltage value for the $n^{th}$ interval is $V_n$, and a minimum voltage value for the $1^{st}$ interval is a preset lower limit voltage value;
determine charging cut-off current values for a $n^{th}$ charging stage for the different temperature ranges, according to the $n^{th}$ interval and the different temperature ranges;
establish the correspondence relationship among the charging cut-off voltage values, the different temperature ranges and the charging cut-off current values.

16. The apparatus of claim 10, wherein the processor is further configured to:
determine a temperature range in which the battery temperature is located;
determine the charging cut-off current value $I_j$ according to the temperature range, the charging cut-off voltage value $V_j$ and the preset mapping relationship.

17. The apparatus of claim 10, wherein the processor is further configured to:
charge the battery with $I_{j+1}$ after controlling $I_j$ to change to $I_{j+1}$ at a predetermined rate.

18. A computer-readable storage medium having computer instructions stored thereon which, when executed on a computer, cause the computer to perform the method for charging a battery of claim 1.

* * * * *